United States Patent [19]

Chen et al.

[11] 4,019,898
[45] Apr. 26, 1977

[54] BENEFICIATION OF ILMENITE ORE

[75] Inventors: James H. Chen; Lewis W. Huntoon, both of Corpus Christi, Tex.

[73] Assignee: Benilite Corporation of America, New York, N.Y.

[22] Filed: Apr. 30, 1976

[21] Appl. No.: 682,099

[52] U.S. Cl. .............................. 75/101 R; 75/114; 75/2; 75/121; 423/82; 423/86

[51] Int. Cl.² .................... C22B 1/00; C22B 34/12

[58] Field of Search ............ 75/101 R, 2, 114, 121; 423/82, 86

[56] References Cited

UNITED STATES PATENTS

| | | | |
|---|---|---|---|
| 2,818,347 | 12/1957 | Brickenkamp et al. | 106/300 |
| 3,149,963 | 9/1964 | Evans et al. | 75/101 R |
| 3,193,376 | 7/1965 | Lo et al. | 75/2 |
| 3,252,787 | 5/1966 | Shiah | 75/1 |
| 3,607,012 | 9/1971 | Schossberger et al. | 423/82 |
| 3,660,078 | 5/1972 | Yamada et al. | 75/101 R |
| 3,811,871 | 5/1974 | Taylor | 75/121 X |
| 3,825,419 | 7/1974 | Chen | 423/86 X |
| 3,834,893 | 9/1974 | Queneau et al. | 75/2 |
| 3,856,512 | 12/1974 | Palmer et al. | 75/101 R |
| 3,861,903 | 1/1975 | Coyle et al. | 423/86 X |

*Primary Examiner*—G. Ozaki
*Attorney, Agent, or Firm*—Brumbaugh, Graves, Donohue & Raymond

[57] ABSTRACT

A small amount of sulfate ion is added to the hydrochloric acid leach liquor used to beneficiate ilmenite ore whereby fines or slime formation in the mother liquor is minimized or reduced and the color of the solid beneficiated ilmenite product is lighter.

8 Claims, No Drawings

BENEFICIATION OF ILMENITE ORE

In the process of beneficiating ilmenite ore by leaching with hydrochloric acid to produce beneficiated ilmenite or synthetic rutile, the objective is to get as much iron value and other impurities dissolved in and thus removed by the acid, while leaving as much titanium value remaining intact in the solid residue, which is the product.

In reality, depending on the type of ilmenite and process conditions used, some titanium value would be dissolved in the hydrochloric acid as titanium chloride. Then under the influence of heat, the latter would hydrolyze into and precipitate out as titanium oxide hydrate "fines" or "slime" of very fine particle sizes in colloidal state. The amount of such fines or slime normally is less than about 3% by weight for "low fines-forming" ilmenites, is from about 3% to about 6% by weight for "medium finesforming" ilmenites, and is more than about 6% by weight for "high fines-forming" ilmenites, expressed in terms of the $TiO_2$ content in the original ilmenite.

Since such $TiO_2$ hydrate fines or slime is very difficult to separate and economically recover from the mother liquor, the formation of such fines or slime is a direct loss of titanium value. It is also an operational nuisance. Excessive fines or slime formation would make the beneficiation process uneconomical or inoperable.

The present invention relates to a novel process or technique by which the formation of the fines or slime in the mother liquor can be minimized or reduced. It thus not only minimizes the loss of titanium value during processing, but also makes those "high fines-forming" ilmenites economically feasible for beneficiation into synthetic rutile.

The major application of the beneficiated ilmenite or synthetic rutile is to replace the scarce natural rutile ore for making titanium tetrachloride and from which $TiO_2$ pigment and titanium metal can be prepared. There are other applications, such as in the ceramics and welding rod industries. Furthermore, higher or purer grades of beneficiated ilmenite or synthetic rutile, when finely ground or micronized, possess strong hiding power and other pigment properties similar to the regular $TiO_2$ pigment except that the color is not white. The micronized product, which has a buff color, can be used as an economical replacement for $TiO_2$ pigment where white color is not required; and the lighter the buff color, the wider its application as a pigment.

The new process or technique of this invention, which can minimize the formation of the fines and slime, can also lighten the color of the beneficiated product. Normally, using the same ilmenite, the intensity of the color of the beneficiated product is related to the residual iron content in the product. The higher the residual iron content, the darker the color. By using this new technique, however, a significantly lighter colored product is obtained even though the residual iron content remains about the same.

Since a lighter colored product has a much greater marketability as a pigment when micronized, it represents another economic value of this new technique.

Typically, a hydrochloric acid leaching process involves four major process steps as follows:

1. Pre-leaching treatment of ilmenite ore. Generally, this involves a reduction roasting of the ore at a temperature of between about 700° C. and about 1,200° C. The reductant used can be solid (such as coal, coke), or liquid (such as fuel oil), or gaseous (such as hydrogen, carbon monoxide), or a mixture of such reductants.

The degree of reduction can be partial — just to reduce most of the ferric iron in the ore to the ferrous state. It can also be substantially complete — to reduce most of the iron value all the way down to metallic iron.

For certain unweathered ilmenites which contain mainly ferrous iron, the reduction roasting step may be omitted.

In some processes, a pre-oxidation roasting to convert most of the iron value to the ferric state is employed prior to the reduction roasting step.

2. Hydrochloric acid leaching. Pre-treated or untreated ilmenite ore is mixed with a suitable amount (generally about 15–30% in excess of the stoichiometric requirement) of hydrochloric acid in a vessel where the reaction to dissolve the iron value and other impurities takes place with added heat and a suitable form of stirring or agitation of the contents.

A common concentration of the acid used is about 18–20% HCl, which is the usual concentration of the acid regenerated from the mother liquor. Other concentrations can be used, although they may not be economical. Leaching temperature may range from about 100° C. to about 150° C. for a leaching period of from about 6 to about 14 hours.

Leaching may be accomplished in one or more stages, batch or continuous, and at atmospheric pressure or greater, e.g., up to 50 psig. The total amount of hydrochloric acid used in all stages generally is from about 2 to about 3.8 parts by weight thereof per one part by weight of the ilmenite ore. When the desired degree of leaching is achieved, the mother liquor is separated by conventional means from the solid residue. The former is transferred to the acid regeneration system for the regeneration of HCl, while the latter is washed with water to practically free it from the mother liquor prior to calcination.

3. Calcination of leached ilmenite. The wet solid residue after washing is calcined under a temperature of about 700°–1200° C. for the removal of both free and combined water. The product, beneficiated ilmenite or synthetic rutile, usually contains about 90–95% $TiO_2$ depending on the composition of the original ilmenite used.

4. Regeneration of hydrochloric acid. The mother liquor containing mainly water, iron chlorides, and some free Hcl is "spray-roasted" in the presence of air whereby the iron chlorides are converted into HCl and iron oxide. The regenerated HCl is absorbed in water to form about 18–20% HCl and recycled back into the leaching step. The iron oxide is a by-product.

The formation of the fines or slime occurs during the acid leaching step. As mentioned above, any formation of the fines or slime is a direct loss of $TiO_2$ value. If the formation is excessive, the fines or slime will make the mother liquor so thick and viscous that effective separation of the mother liquor from the solid residue becomes impossible. Excessive fines or slime in the mother liquor will also make the acid regeneration system difficult to operate.

The new process or technique of the present invention is applied to the hydrochloric acid leaching step. It involves the addition to the hydrochloric acid of sulfate ion in a small amount of from about 0.5% to about 2.5% of the weight of the ilmenite ore. The sulfate ion can be added in the form of sulfuric acid or a ionizable inorganic sulfate salt, such as ferrous sulfate, ferric sulfate, aluminum sulfate or calcium sulfate, or a mixture of such sulfates. Depending on the type of ileminite ore used, in a multi-stage leaching step the amount of the sulfate ion added ranges from about 0.5% to about 1.5% of the weight of the ilmenite ore for the first stage leaching and from 0 to about 1% of the weight of the ilmenite ore for the second or subsequent stage leaching. The sulfate ion is generally added to the hydrochloric acid prior to a leaching stage, although it could be added at the beginning of a leaching stage.

The following examples will illustrate the effectiveness of this new process or technique of the invention.

EXAMPLE 1

The ilmenite ore used in this example was of Eastern Malaysia origin and was a "high fines-forming" ilmenite. The ilmenite was first mixed with 2% of its weight of No. 6 heavy fuel oil and the mixture was heated in a muffle furnace at 800° C. for 30 minutes. The reduced ore was then mixed with 19% hydrochloric acid in a glass bottle which was rotated on a jar mill and heated by heat lamps. The leaching was done in two stages. After the first stage was done, the mother liquor was removed by decantation and fresh 19% hydrochloric acid was added for the second stage leaching. After the second stage was done, the mother liquor was removed and the solid residue washed with water. The washed solid was then calcined over a gas burner.

Three tests were performed. Test A was a control test which did not use the mew techniques of the invention. Test B and Test C used the technique of the invention with the addition to the hydrochloric acid of sulfuric acid and calcium sulfate in the form of gypsum, respectively.

The test results are tabulated in Table I below.

TABLE I

| Test | A (Control) | B | C |
|---|---|---|---|
| Ilmenite Reg. No. | I-111-M | I-111-M | I-111-M |
| $TiO_2\%$ | 54.47 | 54.47 | 54.47 |
| FeO% | 31.08 | 31.08 | 31.08 |
| $Fe_2O_3\%$ | 11.32 | 11.32 | 11.32 |
| Reduction | | | |
| Reductant | No. 6 Oil | No. 6 Oil | No. 6 Oil |
| Amount, % of ilm. wt. | 2 | 2 | 2 |
| Temperature ° C. | 800 | 800 | 800 |
| Time, minutes | 30 | 30 | 30 |
| Reduced Ilmenite | | | |
| FeO% | 38.83 | 38.72 | 38.72 |
| $Fe_2O_3\%$ | 3.47 | 3.65 | 3.65 |
| Leaching | | | |
| HCl Concentration % | 19 | 19 | 19 |
| No. of leachings | 2 | 2 | 2 |
| 19% HCl/Ilm. ratio | | | |
| 1st leaching | 1.7 | 1.7 | 1.7 |
| 2nd leaching | 1.5 | 1.5 | 1.5 |
| Additive | None | $H_2SO_4$ | Gypsum |
| 1st leaching | — | 1% | 1% |
| 2nd leaching | — | 0.5% | 1% |
| Leaching time | | | |
| 1st leaching, hr. | 4 | 4 | 4 |
| 2nd leaching, hr. | 4 | 4 | 4 |
| Leaching temp. ° C. | 143 | 143 | 143 |
| Product | | | |
| $TiO_2\%$ | 96.37 | 96.72 | 96.61 |
| Total Fe% | 1.66 | 1.79 | 1.53 |
| Ilmenite/Product | 1.90 | 1.82 | 1.82 |
| $TiO_2$ Recovery % | 93.1 | 97.6 | 97.5 |
| $TiO_2$ loss as fines % | 6.9 | 2.4 | 2.5 |
| Color | Dark | Light | Medium |

The amount of fines or slime formation in control Test A was equivalent to 6.9% of the $TiO_2$ in the original ilmenite (as opposed to Tests B and C where the amount was minimized or reduced to 2.4% and 2.5%, respectively). At that degree of fines or slime formation, the mother liquor was too thick and viscous for effective decantation. The solid residue of the leached ilmenite could not settle well in a reasonably short time and much of it would go out with the mother liquor when decanted. The mother liquor thus had to be diluted with water for decantation in order to determine the respective amounts of the fines and the product. Such being the case, this "high fines-forming" ilmenite would not be suitable for commercial beneficiation without using the new technique of the invention.

EXAMPLE 2

The ilmenite ore used in this example of Eastern Australia origin, and was a "medium fines-forming" ilmenite. The reductant used was also No. 6 heavy fuel oil. Test procedure was similar to Example 1 except leaching was done in three stages. Two tests were performed. Control Test A was without an additive. Test B used sulfuric acid as the additive. The results are tabulated in Table II below.

TABLE II

| Test | A (Control) | B |
|---|---|---|
| Ilmenite Ref. No. | I-138-A | I-138-A |
| $TiO_2\%$ | 50.17 | 50.17 |
| FeO% | 30.72 | 30.72 |
| $Fe_2O_3\%$ | 15.63 | 15.63 |
| Reduction | | |
| Reductant | No. 6 Oil | No. 6 Oil |
| Amount, % of ilm. wt. | 3 | 3 |
| Temperature ° C. | 850 | 850 |
| Time, Minutes | 30 | 30 |
| Reduced Ilmenite | | |
| FeO% | 36.86 | 36.86 |
| $Fe_2O_3\%$ | 9.02 | 9.02 |
| Leaching | | |
| HCl concentration % | 19 | 19 |
| No. of leachings | 3 | 3 |
| 19% HCl/Ilm. ratio | | |
| 1st leaching | 1.3 | 1.3 |
| 2nd leaching | 1.05 | 1.05 |
| 3rd leaching | 1.05 | 1.05 |
| Additive | | |
| 1st leaching | None | 1% $H_2SO_4$ |
| 2nd leaching | None | 0.5% $H_2SO_4$ |
| 3rd leaching | None | None |
| Leaching time | | |
| 1st leaching, hr. | 3 | 3 |
| 2nd leaching, hr. | 3.5 | 3.5 |
| 3rd leaching, hr. | 4 | 4 |
| Leaching temp. ° C. | 143 | 143 |
| Product | | |
| $TiO_2\%$ | 94.34 | 93.34 |
| Total Fe% | 2.30 | 2.58 |
| Ilmenite/Product | 1.96 | 1.90 |
| $TiO_2$ Recovery % | 95.9 | 97.9 |
| $TiO_2$ loss as fines % | 4.1 | 2.1 |
| Color | Dark | Light |

EXAMPLE 3

The ilmenite ore used in this example was of Western Australia origin, and was a "low fines-forming" ilmenite. No. 6 heavy oil was used as the reductant and leaching was done in two stages. Two tests were performed. Control Test A was without an additive. Test B used sulfuric acid as the additive. The results are tabulated in Table III below.

TABLE III

| Test | A (Control) | B |
|---|---|---|
| Ilmenite Ref. No. | I-31-A | I-31-A |
| $TiO_2\%$ | 54.12 | 54.12 |
| FeO% | 19.35 | 19.35 |
| $Fe_2O_3\%$ | 21.19 | 21.19 |
| Reduction | | |

TABLE III-continued

| Test | A (Control) | B |
|---|---|---|
| Reductant | No. 6 Oil | No. 6 Oil |
| Amount, % of ilm. wt. | 3 | 3 |
| Temperature, °C. | 850 | 850 |
| Time, Minutes | 30 | 30 |
| Reduced Ilmenite | | |
| FeO% | 35.88 | 35.42 |
| $Fe_2O_3$% | 3.73 | 4.18 |
| Leaching | | |
| HCl concentration % | 19 | 19 |
| No. of leachings | 2 | 2 |
| 19% HCl/Ilm. ratio | | |
| 1st leaching | 1.6 | 1.6 |
| 2nd leaching | 1.4 | 1.4 |
| Additive | | |
| 1st leaching | None | 0.75% $H_2SO_4$ |
| 2nd leaching | None | None |
| Leaching time | | |
| 1st leaching, hr. | 4 | 4 |
| 2nd leaching, hr. | 4 | 4 |
| Leaching temperature °C. | 143 | 143 |
| Product | | |
| $TiO_2$% | 94.05 | 94.14 |
| Total Fe% | 1.32 | 1.41 |
| Ilmenite/Product | 1.78 | 1.77 |
| $TiO_2$ recovery % | 97.6 | 98.3 |
| $TiO_2$ loss as fines % | 2.4 | 1.7 |
| Color | Medium | Light |

The sulfuric acid used in these tests of Examples 1–3 was 66° Be, technical grade sulfuric acid. The gypsum used was 92% pure agricultural gypsum ($CaSo_4 \cdot 2H_2O$). The amounts were expressed in % of the weight of the ilmenite used. They are based on the sulfuric acid or gypsum as they are, not converted to 100% $H_2SO_4$ or 100% $CaSO_4$ basis.

The above Examples 1–3 clearly demonstrate the effectiveness of the new technique of the invention in minimizing the fines or slime formation and at the same time improving the color of the beneficiated ilmenite product in the hydrochloric acid leaching of ilmenite ore.

What is claimed is:

1. In a process for the beneficiation of ilmenite ore wherein the ilmenite ore is leached with a hydrochloric acid leach liquor to provide a mother liquor containing acid-soluble iron contaminant values and acid-insoluble titanium values and these values are subsequently separated from one another to yield a solid beneficiated ilmenite product, the improvement which comprises leaching the ilmenite ore with a stoichiometric excess of the hydrochloric acid leach liquor containing added sulfate ion in a small amount of from about 0.5% to about 2.5% of the weight of the ilmenite ore, whereby fines or slime formation in the mother liquor is minimized and the color of the solid beneficiated ilmenite product is lighter.

2. The process as defined by claim 1 wherein the sulfate ion is added in the form of sulfuric acid.

3. The process as defined by claim 1 wherein the sulfate ion is added in the form of at least one ionizable inorganic sulfate salt.

4. The process as defined by claim 3 wherein the ionizable inorganic sulfate salt is calcium sulfate.

5. The process as defined by claim 1 wherein the leaching is conducted in more than one stage, the amount of added sulfate ion in the first stage is from about 0.5% to about 1.5% of the weight of the ilmenite ore and the amount of added sulfate ion in the other stages is from 0% to about 1% of the weight of the ilmenite ore.

6. The process as defined by claim 1 wherein the ilmenite ore is a high fines-forming ilmenite ore normally producing more than about 6% by weight fines or slime based on the $TiO_2$ content of the ilmenite ore.

7. The process as defined by claim 1 wherein the ilmenite ore is a medium fines-forming ilmenite ore normally producing from about 3% to about 6% by weight fines or slime based on the $TiO_2$ content of the ilmenite ore.

8. The process as defined by claim 1 wherein the ilmenite ore is a low fines-forming ilmenite ore normally producing less than about 3% by weight fines or slime based on the $TiO_2$ content of the ilmenite ore.

* * * * *